United States Patent [19]

Imai

[11] Patent Number: 4,828,859
[45] Date of Patent: May 9, 1989

[54] METHOD OF AND APPARATUS FOR PROCESSING VACUUM FRY

[75] Inventor: Kunio Imai, Yamagata, Japan

[73] Assignee: Kabushiki Maisha Mominoki, Yamagata, Japan

[21] Appl. No.: 893,418

[22] Filed: Aug. 5, 1986

[30] Foreign Application Priority Data

Mar. 25, 1986 [JP] Japan .................................. 61-068045
Mar. 25, 1986 [JP] Japan .................................. 61-068046

[51] Int. Cl.⁴ .............................................. A23L 1/212
[52] U.S. Cl. .................................... 426/302; 426/305; 426/438; 426/439; 426/524; 426/658
[58] Field of Search ............... 426/438, 302, 305, 439, 426/658, 524

[56] References Cited

U.S. PATENT DOCUMENTS

| | | | |
|---|---|---|---|
| 4,542,030 | 9/1985 | Haury et al. | 426/438 X |
| 4,585,660 | 4/1986 | Sugisawa et al. | 426/438 |
| 4,626,436 | 12/1986 | Bradley et al. | 426/524 X |

Primary Examiner—Peter Chin
Assistant Examiner—Thi Dang
Attorney, Agent, or Firm—Flynn, Thiel, Boutell & Tanis

[57] ABSTRACT

A pretreatment method of frying processing comprises the steps of; dipping a raw material into a sugar solution thereby enabling the material to endure a relatively high temperature; drying-up a fried product for a short period of time without deteriorating the quality thereof at relatively high temperature; and raising the oil temperature at the beginning of frying processing rather than in the middle of the frying processing to stabilize the oil temperature as well as increasing the amount of water initially evaporated thereby shortening the time required for the frying processing.

12 Claims, 2 Drawing Sheets

METHOD OF AND APPARATUS FOR PROCESSING VACUUM FRY

BACKGROUND OF THE INVENTION

1. Field of the Invention

The present invention relates to a method of and apparatus for preprocessing and vacuum-frying vegetables and fruits for preparing desicated foods, etc.

2. Description of the Prior Art

A vacuum fry treatment has widely been employed as a method of processing desicated foods, for which many inventions and devices have been applied. In general, vacuum frying processing supplies heat to a raw material by making use of fats and fatty oils, which are excellent in heat transfer efficiency and dries up and dehydrates the material for a short period of the time. In addition, a food treatment under reduced pressure assures a frying process, whereby deterioration of quality of the material such as browning and fading of the material can be prevented. Moreover, processing at low temperature and low pressure reduces deterioration and oxidation of frying oil and assures a reduced content of the oil penetrating into the material as well as a product excellent in shelf-life stability.

However, such vacuum frying processing violently evaporates 70 to 80% of the water in the material 3 to 5 minutes after starting the processing, whereby the material deforms and contracts and the oil temperature is appreciably lowered to decrease a drying rate. As the result, with an amount of preparing a raw material at once being increased, more time is needed to restore the original high oil temperature, and thus, the frying time is very unstable with the result of providing products having variable quality. To solve the drawbacks described above, primary drying treatments of various kinds to be effected prior to vacuum frying processing have been devised to perform the vacuum frying processing for a short period of time and improve productivity. However, these treatments require separate dryer equipment which may take a lot of time for drying the material and the quality of the material is deteriorated because of the processing at high temperature or a color tone is changed.

Moreover, almost all of the apparatuses to achieve the primary drying treatments are of a batch type of a single frying tank or a continuous type which use a conveyer, and which are not only difficult to keep at a high vacuum, but also produce a bad product because chips of the raw material are softened and deposited on the upper part of a fry basket upon violent evaporation at the beginning of the frying processing. Furthermore, the frying oil becomes dirty and deteriorates the color tone of the product as well as make its taste bad.

SUMMARY OF THE INVENTION

To solve the drawbacks of the prior vacuum frying method, it is an object of the present invention to improve the pretreatment of the frying processing.

To achieve the above object, a method of preparing a vacuum fried food material according to the present invention comprises the steps of (a) dipping a raw material into a sugar solution thereby enabling the materal to endure relatively high temperatures of 100° to 130° C., (b) drying a fried product for a short period of time without deteriorating the quality thereof at relatively high temperature, and (c) raising the oil temperature at the beginning of frying processing rather than in the middle of frying processing in order to stabilize the oil temperature as well as increasing the amount of water initially evaporated and shortening the time required for the frying processing.

In addition, a vacuum frying apparatus according to the present invention comprises (a) a frying tank, (b) an oil tank, (c) a condenser, these members being adapted to circulate frying oil, (d) a filter for keeping the oil clean at all times, and (e) a cylinder enabling a frying case to be thrown introduced into the frying tank by vertically operating the cylinder whereby vacuum dried foods are allowed to have a good appearance without the adherence of any dust thereto.

Furthermore, the vacuum frying apparatus of the present invention is adapted not only to have two parallel frying tanks for alternate use and increased production, but to have two vacuum pumps for improving the degree of vacuum as well as for assuring dried foods of good quality.

A method of pretreatment for vacuum frying processing according to the present invention will be described hereunder.

Vegetables and fruits, etc., are divided and sliced into shapes easy to be fried, and dipped into a mixed sugar solution of saccharides of a single kind or more having high osmotic pressures such as monosaccharides, disaccharides, dextrin, polysaccharides, and thick malt syrup, while raw materials are frozen before and after the treatment process described above.

For the sugar solutions being employed, those including monosaccharides, dextrin, polysaccharides, and thick malt syrup, etc., may be proper, and a mixed sugar solution of a single kind or more thereof can be used. The dipping of the divided raw material into the sugar solution is effected at room temperature ordinarily, but for raw materials difficult to penetrate at room temperature by the sugar solution or those not denatured even under high temperature, the sugar solution may be heated or boiled to achieve the desired purpose. In such a manner, productivity can be improved. However, there are some problems for raw materials undergoing frying processing in that the raw materials can not maintain a swelled state thereof after being fried even with the dipping treatment thereof into the sugar solution, or they are likely to be severely deformed and contracted. To solve a drawback of this type, a pretreatment method according to the present invention is adapted to permit a raw material to be frozen during processing for keeping it a porous state, paticularly after the frying processing. It is expected from this arrangement that the freeze treatment causes the tissue of the material to change and prevents deformation and contraction thereof from being produced upon dehydration. For example, sliced pieces of a carrot, once being frozen under the same processing conditions, get porous and are deformed and contracted, while those not subjected to the freeze treatment are deformed like cherry blossoms and contracted in the ratio of from 20 to 50% as compared with those being frozen.

The above and other objects, features and advantages of the present invention will become more apparent from the following description when taken in conjunction with the accompanying drawings in which a preferred embodiment of the present invention is shown by way of illustraive example.

DESCRIPTION OF THE PREFERRED EMBODIMENT

A vacuum frying apparatus according to the present invention will be described here with reference to the accompanying drawings.

Figure 2:
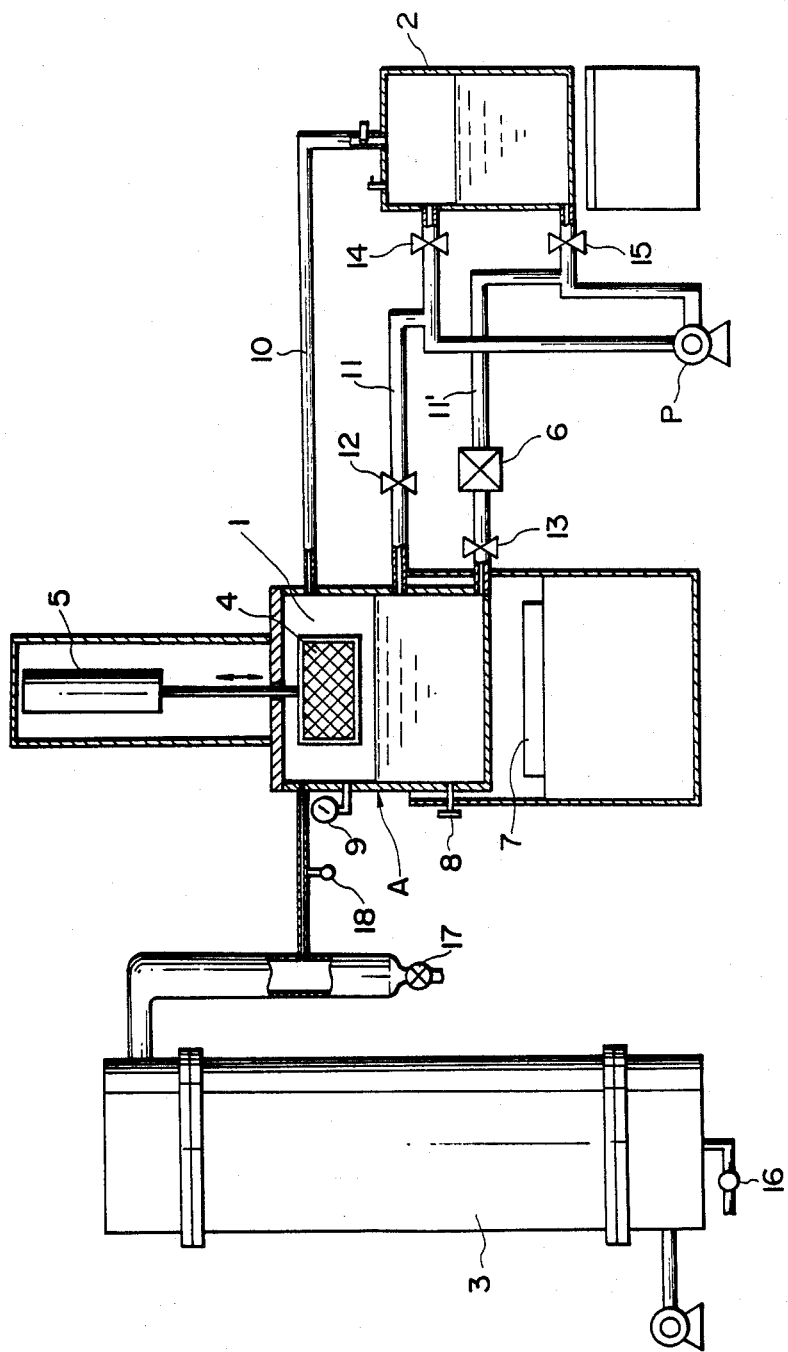
FIG. 2 is a view illustrating an arrangement of FIG. 1.

As shown in FIG. 2, designated at A is a frying tank including an oil tank (1), a frying case (4), a cylinder (5), a gas burner (7), a thermometer (8), and a pressure gage (9). A cylinder (5) is provided just above the oil tank (1), which has the frying case (4) suspended from the tip end of a rod of the cylinder (5), the frying case (4) being made vertically and rotatably movable as shown by the arrow of the figure by means of a switch disposed on a control board (not shown) and a timer. Designated at (2) is an oil tank, which is connected with the oil tank (1) via pipes (11) and (11'). The numeral (6) shown in the pipes (11), (11') designates a filter which has valve units (12), (13), (14), and (15). Designated at P is a pump. In addition, designated at (10) is a vacuum piping connecting the oil tank (1) with the oil tank (2). Likewise, the numeral (3) depicts a condenser serving to condense vaporized water from the frying tank A. Designated at (16) is a drain valve, (17) is an oil drain valve, and (18) is a pressure regulating valve. The frying tank A and the oil tank (2) are located under the atmosphere of reduced pressure by means of a vacuum pump described later, whereby they are capable of transferring and heating any oil while keeping the state being reduced in pressure therein at all times, and thus deterioration of the oil is prevented and oxidation thereof is slowed down for enabling the same oil to be employed over a long period of time.

Let us describe in succession a method of operating the vacuum frying apparatus of the present invention described above with reference to FIG. 2.

Frying oil is fed from the oil tank (2) to the oil tank (1) of the frying tank A via the pipe (11) by operating the pump P and is returned to the oil tank (2) via the return pipe (11'). Thereupon, with the pump P so operated after closing the valves (13), (14), the oil is driven to flow from the oil tank (2) to the oil tank (1) via the pipe (11) and heated to permit frying processing to be started, and, after finishing the frying processing, operated the pump P with the valves (13), (14) being opened and the valves (12), (15) closed, the oil is driven to flow from the oil tank (1) to the oil tank (2) via the pipe (11'). The return pipe (11') has the filter (6), which serves to remove oil cake as well as to keep the oil clean at all times by closing the valves (14), (15), and opening the valves (12), (13) to operate the pump P for circulating the oil.

The oil contained in the oil tank (1) disposed interiorly of the fry tank A is reduced in pressure and can be heated by the gas burner (7), while the fry case (4) containing a material to be fried therein, can be lowered into the oil tanks (1) by operaing the cylinder (5). In frying processing, the fry case (4) is elevated in place on the basis upon an instruction from the control board (not shown) for uniformizing oil temperature and preventing the material to be fried from adhering to the fry case (4). After finishing the frying processing, the fry case (4) is elevated upwardly to rotate and upwardly move a cylinder rod, whereby the oil is shaken off by profitably employing centrifugal force and vibration being produced for yielding a fried product.

Moreover, water vapor produced from a material to be fried during any frying processing is guided to the condenser (3) to permit any oil involved in the water vapor to be freed from the valves (16), (17), while the oil contained in the oil tank (1) is driven to pass through the pipe (11'), cleanned via the filter (6), and returned to the oil tank (2).

Figure 1:
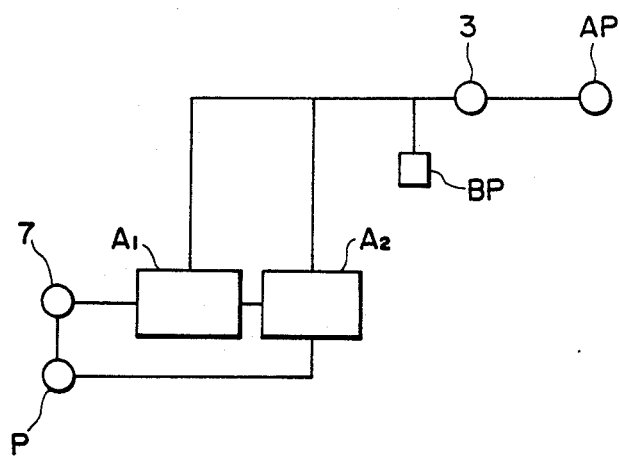
FIG. 1 is a schematical view illustrating a vacuum frying apparatus according to the present invention.

Furthermore, the vacuum frying apparatus according to the present invention is adapted to have a main vacuum pump AP and an auxiliary vacuum pump BP as a vacuum pump as shown in FIG. 1, whereby the degree of vacuum is increased, while the apparatus is adapted to have two parallel frying tanks A1, A2, whereby alternate frying processing, although a batch system, can be achieved for enabling continuous processing to be effected to result in no unevenness of the taste of a fried product.

According to the vacuum frying apparatus of the present invention, as described above, the frying case can be moved up and down in place in the oil tank by operating the cylinder and introduced into the oil tanks to a proper depth, whereby a material to be fried can be prevented from adhereing to the frying case due to swelling and softening thereof as well as materials being fried being pevented from adhereing to each ohter and from being clustered. In addition, since the frying case is rotatable, any oil can be shaken off completely due to centrifugal force not only for assuring a product with a low rate of oil content, but for facilitating an adjustment of an amount of oil contained in the oil tank as well as the oil temperature. Any oil employed in the frying processing is filtered during its circulation for removing oil case therefrom, whereby a fried product is kept clean as well as assuring the long term applicaion of the oil. Furthermore, since any oil employed for frying can be heated in the oil tank, the oil temperature can be quickly restored, and substantially continuous processing can be achieved provided two frying tanks are arranged for preventing fried products from being scattered as well as improving productivity. Thus the vacuum frying apparatus of the present invention can exert an epock-making effect which is not attainable in conventional ones.

Let us describe embodiments in concrete with reference to the accompanying drawings.

First Embodiment:

An apple, after cleaning, is removed from its core, divided into three to four pieces thereof, and sliced into a thickness of from 3 to 5 mm. The sliced materials are dipped into a 40% mixture solution of thick malt syrup: dextrin=1:1 for ten hours at room temperature. After washing water off, the apple is fried into the vacuum chamber of 20 mm Hg at initial temperature of 120° C. and at final temperature of 98° C. for 12 minutes. The apple so fried was good in a color tone as well as in texture.

Thereupon, some apples, depending on their type, may sometimes be severely collapsed, but in that case, any apple of this type can be made porous by freezing it after dipping it in a sugar solution.

Second Embodiment:

An onion after peeling, is divided, sliced, and subjected to a branch treatment for freezing it. The frozen onion is dipped into a 40% mixed solution of thick malt syrup: dextrin=1:1 for 1 hour at 30° C. after adding salt and some spices thereto. After washing water off therefrom, the onion so dipped is fried in vacuum chamber of 20 mm Hg at an initial temperature of 120° C. and at a final temperature of 100° C. for 17 minutes. The resultant product was porous and well salted with the order of the onion being maintained as well as a good feeling of tooth touch with the product.

Third Embodment:

A carrot is cut in round slices of from 2 to 3 mm and blanched at 98° C. for 2 minutes. After the blanch processing, the carrot so prepared is quickly cooled by the use of cooling water and shaken off to remove the water, and frozen. The freezed product is dipped into a 30% mixed solution of thick malt syrup: dextrin=2:1 for 1 hour while adding salt, spices, and chemical flavoring matter thereto. After the shaking off of water, the dipped piece is fried in the vacuum chamber of 20 mm Hg at an initial temperature of 120° C. and a final temperature of 95° C. for 12 minutes. A fresh, rose colored, porous, fried, sweet tasting product being properly salted was yielded.

According to the present method of and apparatus for preparing vacuum fry, as described above, a raw material is dipped, as a pretreatment for vacuum frying any food, into a sugar solution and frozen. Accordingly, the sample can be prevented, even in quick dehydration at the beginning of the frying processing, from being deformed and contracted and kept in a porous state. In addition, the system of the present invention enables, even under high temperature conditions of 100° to 130° C., a material to be fried in a vacuum without deterioration of material quality such as browning and fading, and furthermore allows the acidity and sweetness of the material to be adjusted by selecting the sugar properly, while allowing the taste for the material to be adjusted by adding salt, spices, chemical flavoring water for providing dry foods such as a snack cakes for children and relishes. In addition, since the system enables frying processing to be effeted for a short period of time, nutrition involved in the raw material such as vitamins and the like can be prevented from being deteriorated for assuring epoch-making dry fried foods which can not be formed in prior vacuum fried products.

What is claimed is:

1. In a method of preprocessing and subsequently vacuum frying a raw food material, the improvement wherein said preprocessing comprises the steps of:
   (a) dividing a raw food material;
   (b) freezing the divided raw food material; and
   (c) dipping the resultant frozen raw food material into a solution containing one or more members selected from the group consisting of monosaccharide, and polysaccharides to form a preprocessed raw food material.

2. The method according to claim 1 further including the step of slicing the divided raw food material.

3. The method according to claim 1, wherein said solution is heated during the dipping of the raw food material.

4. The method according to claim 1, wherein said solution is boiled during the dipping of the raw food material.

5. The method according to claim 1, wherein said vacuum frying is at an initial temperature for a first period of time and then at a second temperature lower than said initial temperature for a second period of time.

6. In a method of preprocessing and subsequently vacuum frying a raw food material, the improvement wherein said preprocessing comprises the steps of:
   (a) dividing a raw food material;
   (b) dipping the divided raw food material into a solution containing one or more members selected from the group consisting of monosaccharides, and polysaccharides;
   (c) dewatering the dipped raw food material; and
   (d) freezing the dewatered raw food material to form a preprocessed raw food material.

7. A method for preprocessing a vacuum fry according to claim 6 further including a step of slicing the divided raw food material.

8. The method according to claim 6, wherein said solution is heated during the dipping of the raw food material.

9. The method according to claim 6, wherein said solution is boiled during the dipping of the raw food material.

10. The method according to claim 6, wherein said vacuum frying is at an initial temperature for a first period of time and then at a second temperature lower than said initial temperature for a second period of time.

11. In a method of preprocessing and subsequently vacuum frying a raw food material, the improvement wherein said preprocessing consists essentially of the steps of:
    (a) dividing a raw food material;
    (b) freezing the divided raw food material; and
    (c) dipping the resultant frozen raw food material into a solution containing one or more members selected from the group consisting of monosaccharides, and polysaccharides to form a preprocessed raw food material.

12. In a method of preprocessing and subsequently vacuum frying a raw food material, the improvement wherein said preprocessing consists essentially of the steps of:
    (a) dividing a raw food material;
    (b) dipping the divided raw food material in a solution containing one or more members selected from the group consisting of monosaccharides, and polysaccharides;
    (c) dewatering the dipped faw food material; and
    freezing the dewatered raw food material to form a preprocessed raw food material.

* * * * *

UNITED STATES PATENT AND TRADEMARK OFFICE
CERTIFICATE OF CORRECTION

PATENT NO. : 4 828 859
DATED : May 9, 1989
INVENTOR(S) : Kunio IMAI

It is certified that error appears in the above-identified patent and that said Letters Patent is hereby corrected as shown below:

On the title page, Item [73] - change the name of the assignee to ---Kabushiki Kaisha Mominoki---.

Column 6, line 55; change "faw" to ---raw---.

Signed and Sealed this

Tenth Day of July, 1990

*Attest:*

HARRY F. MANBECK, JR.

*Attesting Officer*      *Commissioner of Patents and Trademarks*